United States Patent
Milley et al.

(10) Patent No.: US 11,336,575 B1
(45) Date of Patent: May 17, 2022

(54) IDENTIFICATION AND RESOLUTION OF EXCESSIVE DATA USAGE TO ALLEVIATE NETWORK CONGESTION

(71) Applicant: Cox Communications, Inc., Atlanta, GA (US)

(72) Inventors: Andrew Joseph Milley, Roswell, GA (US); Bradley Wilton Napier Pfaff, Roswell, GA (US); David Hicks, Atlanta, GA (US); Timothy Andrew Cotter, Marietta, GA (US); Randale Geray Keasler, Atlanta, GA (US); Shahrzad Hariri, Dunwoody, GA (US); Ajay Bahukhandi, Atlanta, GA (US); Sung-eun Kim, San Diego, CA (US); Gina L. Ignatowski, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 279 days.

(21) Appl. No.: 16/408,995

(22) Filed: May 10, 2019

Related U.S. Application Data

(60) Provisional application No. 62/797,750, filed on Jan. 28, 2019.

(51) Int. Cl.
| | |
|---|---|
| *H04L 12/815* | (2013.01) |
| *H04L 1/00* | (2006.01) |
| *H04L 29/06* | (2006.01) |
| *H04L 47/12* | (2022.01) |
| *H04L 43/0876* | (2022.01) |
| *H04L 43/16* | (2022.01) |

(52) U.S. Cl.
CPC ........... *H04L 47/12* (2013.01); *H04L 43/0876* (2013.01); *H04L 43/16* (2013.01); *H04L 63/1408* (2013.01); *H04L 63/1441* (2013.01)

(58) Field of Classification Search
CPC ..... H04L 47/12; H04L 43/0876; H04L 43/16; H04L 63/1408; H04L 63/1441
See application file for complete search history.

(56) References Cited

U.S. PATENT DOCUMENTS

2001/0030785 A1\* 10/2001 Pangrac ............. H04N 21/2402
398/72
2007/0223377 A1\* 9/2007 de Heer ............. H04L 67/1002
370/235

(Continued)

*Primary Examiner* — Christopher B Robinson
(74) *Attorney, Agent, or Firm* — Merchant & Gould P.C.

(57) ABSTRACT

A network, such as a hybrid fiber-coaxial (HFC) network, may comprise a plurality of nodes. Each node may facilitate transmission of service signals between a service provider and a plurality of subscribers. If a node's utilization is determined to be above a predetermined threshold that is indicative of congestion on the node, a system associated with the service provider and/or a third party service may identify a subset of subscribers with excessive data usage. For example, the system may receive usage data for each subscriber serviced by the node, and compare the usage data to a total usage data among the subscribers serviced by the node and/or a standard to identify the subset. Once identified, the system may determine a cause of the excessive data usage for each subscriber within the subset, and determine an action to be performed based on the cause to alleviate the congestion on the node.

20 Claims, 11 Drawing Sheets

(56) References Cited

U.S. PATENT DOCUMENTS

| | | | |
|---|---|---|---|
| 2009/0217326 A1* | 8/2009 | Hasek | H04N 7/17336 725/87 |
| 2010/0103820 A1* | 4/2010 | Fuller | H04W 48/06 370/236 |
| 2012/0158949 A1* | 6/2012 | Lee | H04L 41/0896 709/224 |
| 2012/0233656 A1* | 9/2012 | Rieschick | H04W 12/08 726/1 |
| 2013/0316703 A1* | 11/2013 | Girard | G06Q 30/0257 455/432.1 |
| 2014/0007235 A1* | 1/2014 | Glenn | H04L 63/20 726/23 |
| 2014/0022900 A1* | 1/2014 | Salot | H04W 28/0205 370/235 |
| 2014/0047103 A1* | 2/2014 | Dankberg | H04M 15/8016 709/224 |
| 2015/0016253 A1* | 1/2015 | Jaska | H04L 47/22 370/230.1 |
| 2015/0046301 A1* | 2/2015 | Wuerch | G06Q 40/12 705/30 |
| 2017/0156141 A1* | 6/2017 | Reynolds | H04M 15/781 |

* cited by examiner

Portal 402

Notification 400A

Dear Subscriber,

We noticed that your data usage patterns have changed recently and ran a quick check to make sure everything is OK with your service.

Based on your current use, we recommend a transfer of your services to a different platform.

We believe a fully fiber solution may be a better fit than the HFC network through which you are currently receiving service.

If you'd like information about the fiber solution please click here or call a customer service agent at 1-800-123-4567.

If you would like to proceed with the transfer please select the appropriate option below.

CANCEL

PROCEED WITH TRANSFER

FIG. 4A

IDENTIFICATION AND RESOLUTION OF EXCESSIVE DATA USAGE TO ALLEVIATE NETWORK CONGESTION

CROSS-REFERENCE TO RELATED APPLICATION

This application claims the benefit of U.S. Provisional Application No. 62/797,750, having the title of "IDENTIFICATION AND RESOLUTION OF EXCESSIVE DATA USAGE TO ALLEVIATE NETWORK CONGESTION" and the filing date of Jan. 28, 2019, which is incorporated herein by reference in its entirety.

BACKGROUND

Customers may subscribe to and consume services over a variety of networks. In one example, a service provider may provide high speed data services, such as cable internet, to subscribers over a hybrid fiber-coaxial (HFC) network. The HFC network may be comprised of fiber optic nodes, each node servicing a set of subscribers. A number of subscribers on a node may be anywhere between 200 and 1,000 subscribers, for example. As additional subscribers are added to a node or if existing subscribers serviced by the node increase their data usage, the utilization of the node increases, which in turn increases congestion and slows down service speeds.

Conventionally, a node may be split when a certain level of congestion is reached. Specifically, an aggregate measure based on the utilization of the node may be used to determine when to split a node. For example, when the measure indicates the node has reached a threshold level of utilization (e.g., 70%), the node may be split in attempt to alleviate congestion on the node. Node splitting is intended to lower the utilization of the node by dividing subscribers into two or more new nodes, thus distributing their utilization over the two nodes. For example, if the node's utilization is 70%, node splitting would be performed with the intent to create two new nodes at 35% utilization each. This is based on an assumption that each subscriber on the node is using services equally.

Node splitting is expensive, costing anywhere from $50,000 to $200,000. Node splitting also impacts the service provided to the subscribers that are serviced by the node being split. For example, not only may service be impacted due to the congestion leading up to the node split, but full service interruptions may occur during one or more days during the split itself. Additionally, because the assumption that each subscriber on the node is using services equally is often not true, the outcome of node splitting may not be as intended. Instead, there may be only be a small subset of the subscribers on the node that are driving the high utilization. As a result, splitting the node with the 70% utilization, may actually result in a first new node at 10% utilization and a second new node at 60% utilization because the manner in which the node was split caused a majority of the subscribers driving the high utilization to be split onto the same (e.g., the second) new node. Moreover, in some cases, high utilization by one or more of the subset of subscribers may be caused by malware and/or policy violations, for example. Thus, splitting the node to divide the subscribers would not effectively resolve the underlying issues driving the high utilization and corresponding congestion.

Due to the above-described deficiencies and limitations of node splitting, an alternative technical solution is needed to alleviate congestion on a network node.

SUMMARY

Aspects of the present disclosure provide a system, method, and computer readable storage device for identifying and resolving excessive data usage to alleviate network congestion. For example, a network, such as a hybrid fiber-coaxial (HFC) network may comprise a plurality of nodes. Each node may facilitate transmission of service signals between a service provider and a plurality of subscribers. A system associated with the service provider and/or a third party service may receive utilization data for each node. If, based on the received utilization data, a utilization of a node is determined to be above a predetermined threshold that is indicative of congestion on the node, the system may receive usage data for each subscriber serviced by the node. Based on the usage data for the subscribers, the system may identify a subset of subscribers with excessive data usage. Once identified, the system may determine a cause of the excessive data usage for each subscriber within the subset, and determine an action to be performed based on the cause to alleviate the congestion on the node.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIGS. 4A, 4B, and 4C illustrate example notifications provided to subscribers identified as having excessive data usage.

DETAILED DESCRIPTION

Aspects of the present disclosure enable identification of individual subscribers that are driving high utilization on a network node upon a determination that the node is congested. For each of the identified subscribers, a cause of the excessive data usage may be determined and actions to be performed based on the cause may be determined in order to alleviate the congestion on the node.

Figure 1:
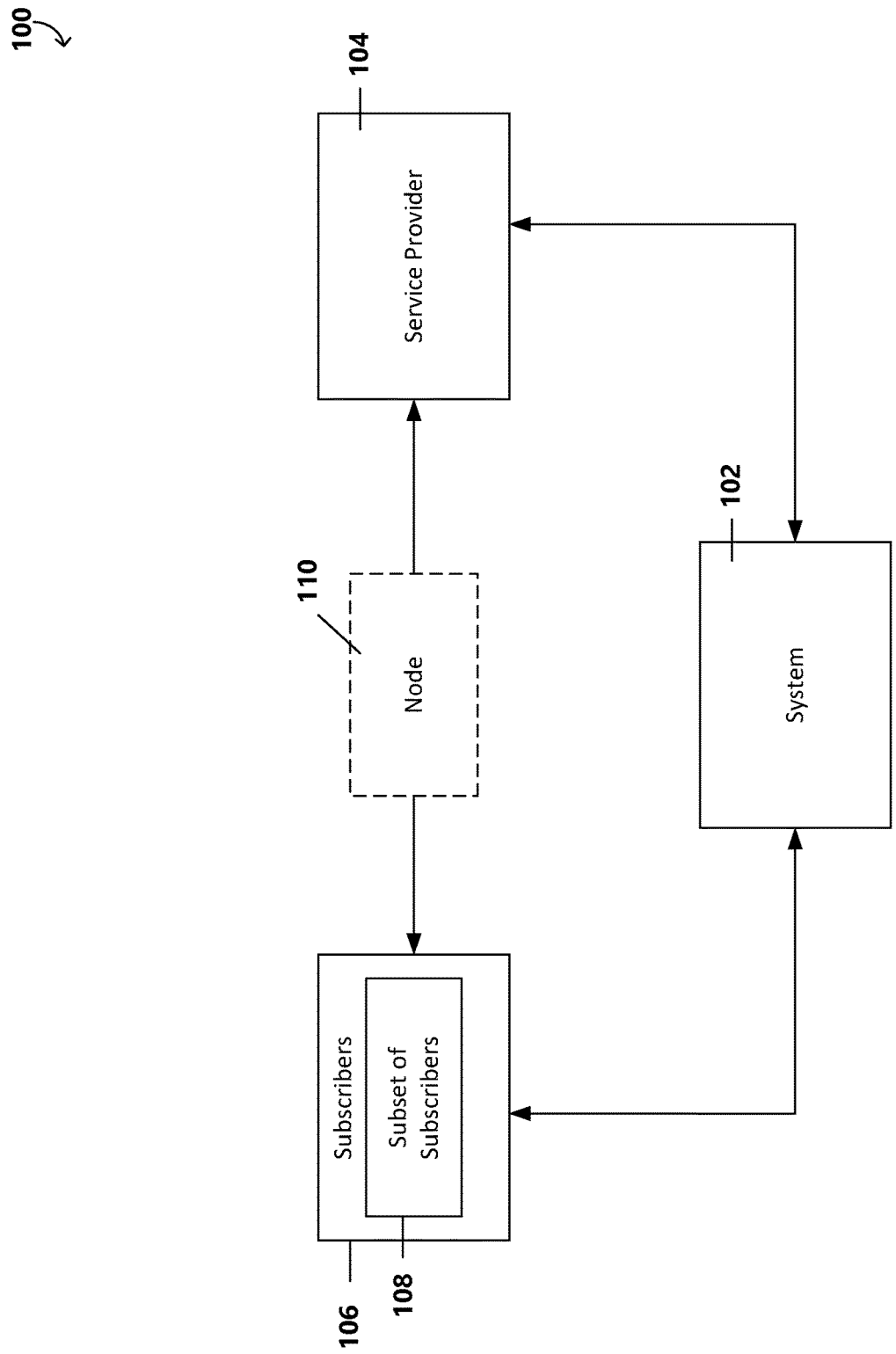
FIG. 1 is a block diagram of an example environment in which a system of the present disclosure can be implemented.

FIG. 1 is a block diagram of an example network environment 100 in which a system of the present disclosure can be implemented.

A service provider 104 may provide one or more services to a plurality of subscribers 106 over a network. Some networks may utilize one or more nodes, such as node 110, to facilitate transmission of service signals between the service provider 104 and the subscribers 106. For example, a cable modem termination system (CMTS) of the service provider 104 may provide high speed data services, such as cable internet, to modems of the subscribers 106 via a plurality of nodes of an HFC network, as described in detail in conjunction with FIG. 2.

The network may be oversubscribed meaning the service provider 104 may sell the services to the subscribers 106 based on a maximum possible speed, but the subscriber may not always be guaranteed to have the maximum speed. The actual speed provided may be dependent on network or node congestion. For example, if many of the subscribers 106 are attempting to use the network simultaneously, the node 110 may become temporarily congested. Additionally, as additional subscribers are added to the node 110 or if existing subscribers increase their data usage, the node 110 may become more permanently congested.

The service provider 104 may measure utilization of the network (e.g., utilization of the node 110) in order to determine when the network is becoming congested and service speeds are becoming affected. Utilization may be measured by monitoring an amount of data transmitted in signals sent in both directions between the service provider 104 and the subscribers 106 via the node 110, referred to as utilization data. The amount of data may be compared to a data capacity for the first node 208 to determine the utilization.

Conventionally, in response to a determination that the utilization of the node 110 was above the predetermined threshold, the node 110 would be split into two new nodes, among which the subscribers 106 of the node 110 would be divided. For example, one half of the subscribers 106 would be served by a first new node and the other half of subscribers 106 would be served by a second new node. Thus, the node splitting, which is based on an assumption that each subscriber is using services equally, would be performed with the intent that the first and second new nodes would each have half the utilization of the node 110 being split.

However, as previously discussed, node splitting is expensive and impacts the service provided to subscribers 106 that are serviced by the node 110 as it is being split. Additionally, because the assumption that each subscriber is using services equally is often not true, the outcome of node splitting may not be as intended. Instead, there may be only be a small number of the subscribers 106 that are driving the high utilization. As a result, if the node 110 is split when 70% utilization is reached, for example, the split may result in a first new node at 10% utilization and a second new node at 60% utilization because the manner in which the subscribers were divided among the new nodes caused the subscribers driving the high utilization to still be serviced by the same (e.g., the second) new node. Moreover, in some cases, high utilization by some of the subscribers 106 may be caused by malware and/or policy violations, for example. Thus, splitting the node 110 to divide the subscribers 106 may not resolve the underlying issues driving the high utilization and corresponding congestion.

Embodiments herein are directed to methods and systems for identifying a subset of subscribers 108 with excessive data usage, determining a cause of the excessive data usage, and determining actions to be performed based on the cause in order to alleviate congestion on the node 110. Example causes may include excessive data usage, malware, and/or policy violations, among other causes. Example actions may include transferring the subscriber's services to another platform, removing malware, and/or providing details on the policy violations and instructions on how to get in compliance with the policy. Thus, in comparison to the time and exorbitant costs involved for node splitting, which may not even resolve the underlying cause of the congestion and thus the congestion itself, the embodiments are directed to a more individualized, directed approach that is time and cost effective and may more accurately diagnosis and resolve the cause of the congestion.

For example, a system 102 hosted by the service provider 104 or a third party service may receive the utilization data for the node 110 from the service provider 104. If, based on the utilization data, the utilization of the node 110 is above a threshold indicative of congestion, the system 102 may identify the subset of subscribers 108 with excessive data usage.

To identify the subset of subscribers 108, the system 102 may receive usage data from modems of each of the subscribers 106. If a subscriber has more than one modem, usage data from each of the modems associated with the subscriber may be aggregated such that the usage data may be analyzed on a per subscriber level. The usage data received from each modem includes signals received at the modem from the service provider 104 via the node 110 and signals transmitted from the modem to the service provider 104 via the node 110.

The system 102 may compare the usage data received for each of the subscribers 106. In some embodiments, the usage data of a subscriber is compared to a total data usage of the subscribers 106 to determine a proportional data usage of the subscriber. If the subscriber's proportional data usage is above a predetermined threshold (e.g., 5%), that subscriber may be included within the subset of subscribers 108. In other embodiments, the usage data of a subscriber is compared to a standard. For example, the standard may be a predetermined amount of data within a time period (e.g., a number of terabytes of data in a week period). If the subscriber's absolute data usage exceeds the standard, that subscriber may be included within the subset of subscribers 108.

For each subscriber included within the subset of subscribers 108, the system 102 may then determine a cause of the excessive data usage and an action to be performed based on the cause. The system 102 may notify the service provider 104 and/or the subset of subscribers 108 of the excessive data usage, reasons for the excessive data usage, and the determined actions to be performed. In some embodiments, the system 102 may perform one or more of the determined actions in conjunction with service provider 104. For example, if the system 102 is hosted by the service provider 104. In other embodiments, the service provider 104 may use the information provided by the system 102 to independently perform the determined actions. For example, if the system 102 is hosted by a third party service.

Each component in the example network environment 100 includes one or more computing devices such as servers, workstations, desktop computers, laptop computers, tablets, mobile phones, smart devices, etc., and one or more databases. Further details of the computing devices and variations thereof can be found in FIGS. 7, 8A, 8B, and 9.

Figure 2:
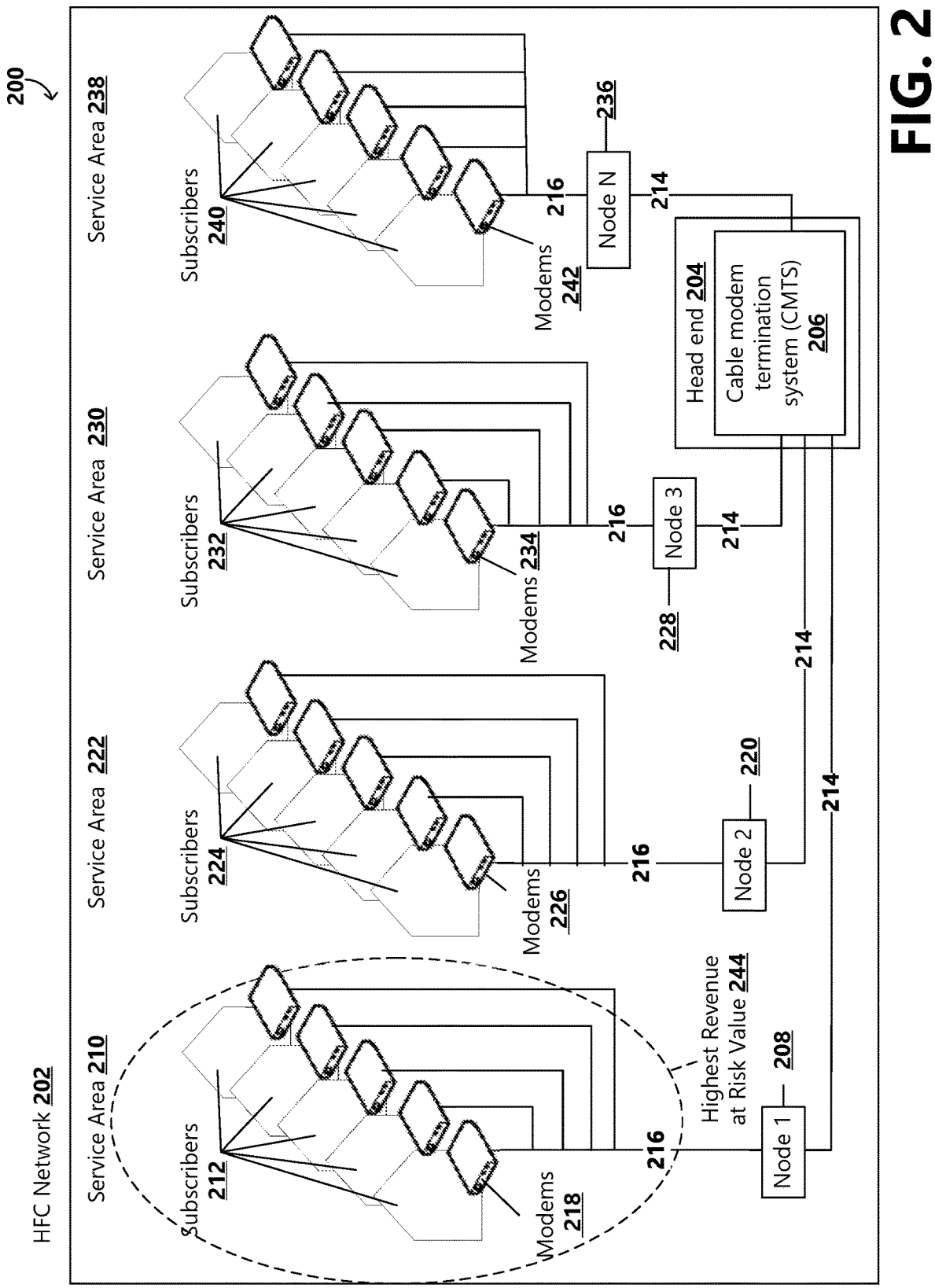
FIG. 2 is a conceptual illustration of an example HFC network in which a system for identifying and resolving excessive data usage can be implemented to alleviate network node congestion.

FIG. 2 is a conceptual illustration 200 of an example HFC network 202 in which a system 102 for identifying and resolving excessive data usage may be implemented to alleviate network node congestion. The HFC network 202 may extend from a head end 204 of a service provider 104 to a plurality of nodes (e.g., 208, 220, 228, and 236), where each node serves a plurality of subscribers (e.g., 212, 224, 232, and 240, respectively). For example, each node may serve 200 to 1,000 subscribers within a service area, where the subscribers may subscribe for residential and/or business services.

For simplicity, four nodes are illustrated, however there may be thousands of nodes within the HFC network 202. A first node 208 may serve a first set of subscribers 212 within a first service area 210. A second node 220 may serve a second set of subscribers 224 from a second service area 222. A third node 228 may serve a third set of subscribers 232 from a third service area 230. An $n^{th}$ node 236 may serve an $n^{th}$ set of subscribers 240 from an $n^{th}$ service area 238.

The service provider 104 may use a cable modem termination system (CMTS) 206 located within the head end 204 to provide high speed data services such as cable Internet, among other similar services, to the various sets of subscribers 212, 224, 232, and 240. For example, the CMTS 206 may encode, modulate, and upconvert one or more of the services onto radio frequency (RF) carriers, combine the RF carriers into a single electrical signal, and insert the electrical signal into a broadband optical transmitter. The broadband optical transmitter may convert the electrical signal to a downstream optically modulated signal that is sent to one or more of the nodes 208, 220, 228, and 236 over one or more fiber optic cable lines 214.

Each of the nodes 208, 220, 228, and 236 may include a broadband optical receiver to convert the downstream optically modulated signal to an electrical signal (e.g., translate the signal from a light beam to RF). The nodes 208, 220, 228, and 236 may send the electrical signal over one or more coaxial cable lines 216 to respective modems (e.g., 218, 226, 234, and 242) of the set of subscribers serviced by the node. For example, the first node 208 may send the electrical signal to modems 218 of the first set of subscribers 212. The second node 220 may send the electrical signal to modems 226 of the second set of subscribers 224. The third node 228 may send the electrical signal to modems 234 of the third set of subscribers 232. The $n^{th}$ node 236 may send the electrical signal to modems 242 of the $n^{th}$ set of subscribers 240. Each subscriber within a set of subscribers may have at least one modem, as illustrated. In some examples, RF amplifiers may be placed at intervals along the coaxial cables lines 216 to overcome cable attenuation and passive losses of the electrical signal caused by splitting or tapping the coaxial cables lines 216. Upon receipt of the electrical signal, the modems 218, 226, 234, and 242 may demodulate the electrical signal in order to deliver the services to one or more devices of the respective subscribers, including a desktop computer, laptop computer, a mobile phone, and a tablet, among other examples.

The HFC network 202 may operate bi-directionally, whereby signals are transmitted in both downstream and upstream directions. For example, downstream signals may transmit data from the head end 204 to the modems 218, 226, 234, and 242 via the respective nodes 208, 220, 228, and 236. The data transmitted in the downstream signals may include content associated with the one or more services being provided, such as video content, voice data, and Internet data, among other examples. The upstream signals may transmit data from the modems 218, 226, 234, and 242 to the head end 204 via the nodes 208, 220, 228, and 236. The data transmitted in the upstream signals may include control signals. The control signals may include requests for additional content to be provided and/or performance of actions associated with the services.

As additional subscribers are added to one or more of the nodes 208, 220, 228, and 236, or if one or more of the set of subscribers 212, 224, 232, and 240 already serviced by one of the nodes 208, 220, 228, and 236 increase their data usage, one or more of the nodes 208, 220, 228, and 236 may become congested. As congestion increases, a speed at which services are provided may be decreased, often resulting in subscriber frustration. A level of congestion may be determined by measuring a utilization of each of the nodes 208, 220, 228, and 236 based on utilization data collected by the CMTS 206.

To provide an example, utilization of the first node 208 may be measured. The CMTS 206 may monitor an amount of data transmitted in downstream signals from the CMTS 206 to the modems 218 via the first node 208 and an amount of data in the upstream signals received by the CMTS 206 from the modems 218 via the first node 208 over a period of time. The amount of data transmitted and/or received may be compared to a data capacity for the first node 208 to determine the utilization. In some embodiments, a computing device associated with the CMTS 206 may perform the monitoring and comparison to determine the utilization. A utilization above a predetermined threshold (e.g., 70%) may indicate congestion on the first node 208, and performance of an action to alleviate the congestion may be desirable to prevent slowing of service speed and subsequent subscriber frustration.

Conventionally, in response to a determination that the utilization of the first node 208 was above the predetermined threshold, the first node 208 would be split into two new nodes, among which the first set of subscribers 212 would be divided. However, as previously discussed, node splitting is expensive and impacts the service provided to the first set subscribers 212 of the first node 208 as it is being split. Additionally, because the assumption on which node splitting is based (e.g., that each subscriber is using services equally) is often not true and issues other than sheer data usage may be causing the congestion, node splitting may not alleviate the congestion as intended.

Thus, rather than splitting the first node 208, in response to a determination that the utilization of the first node 208 is above the predetermined threshold, embodiments herein are directed to identifying a subset of the first set of subscribers 212 with excessive data usage. The subset may be identified based on subscriber usage data monitored by and received from the modems 218, as described in greater detail in conjunction with FIG. 3. For each subscriber within the identified subset, a cause for the excessive data usage and one or more actions to be performed based on the cause may be determined in order to alleviate the congestion on the first node 208. In comparison to the time and exorbitant costs involved to split the first node 208, which may not even resolve the underlying cause of the congestion and thus the congestion itself, the embodiments are directed to a more individualized, directed approach that is time and cost effective and may more accurately diagnosis and resolve the cause of the congestion.

A utilization of each other node of the HFC network 202 (e.g., the second node 220, the third node 228, and the $n^{th}$ node 236) may be monitored and analyzed in a manner similar to the first node 208 discussed in the above-provided example. However, in some embodiments, because the HFC network 202 may have thousands of nodes, with each node servicing between 200 and 1,000 subscribers, the system may preserve resources by prioritizing the nodes 208, 220, 228, and 236 based on a revenue at risk value. Only nodes with higher priorities (e.g., higher revenue at risk values) that have a utilization above the predetermined threshold indicative of congestion may be selected for the system 102 to identify which subset of subscribers have excessive data usage, determine causes for the excessive data usage, and determine actions to be performed in order to alleviate the congestion.

Revenue at risk values may be calculated for each of the nodes 208, 220, 228, and 236 based on a number of subscribers serviced by the respective node, an amount paid by the subscribers serviced by the respective node, an ability to obtain additional subscribers to be serviced by the respective node (e.g., a remaining opportunity in the respective service area), and a level of service currently provided by the respective node. In one example, the first node 208 may be determined to have the highest revenue at risk value 244. Accordingly, the first node 208 may be prioritized over the other nodes and have its utilization monitored and analyzed first to determine whether the first node 208 is congested and if so, alleviating the congestion by identifying subscribers with excessive data usage, determining a cause for the excessive data usage, and determining actions to be performed based on the cause to alleviate the congestion on the node.

Figure 3:
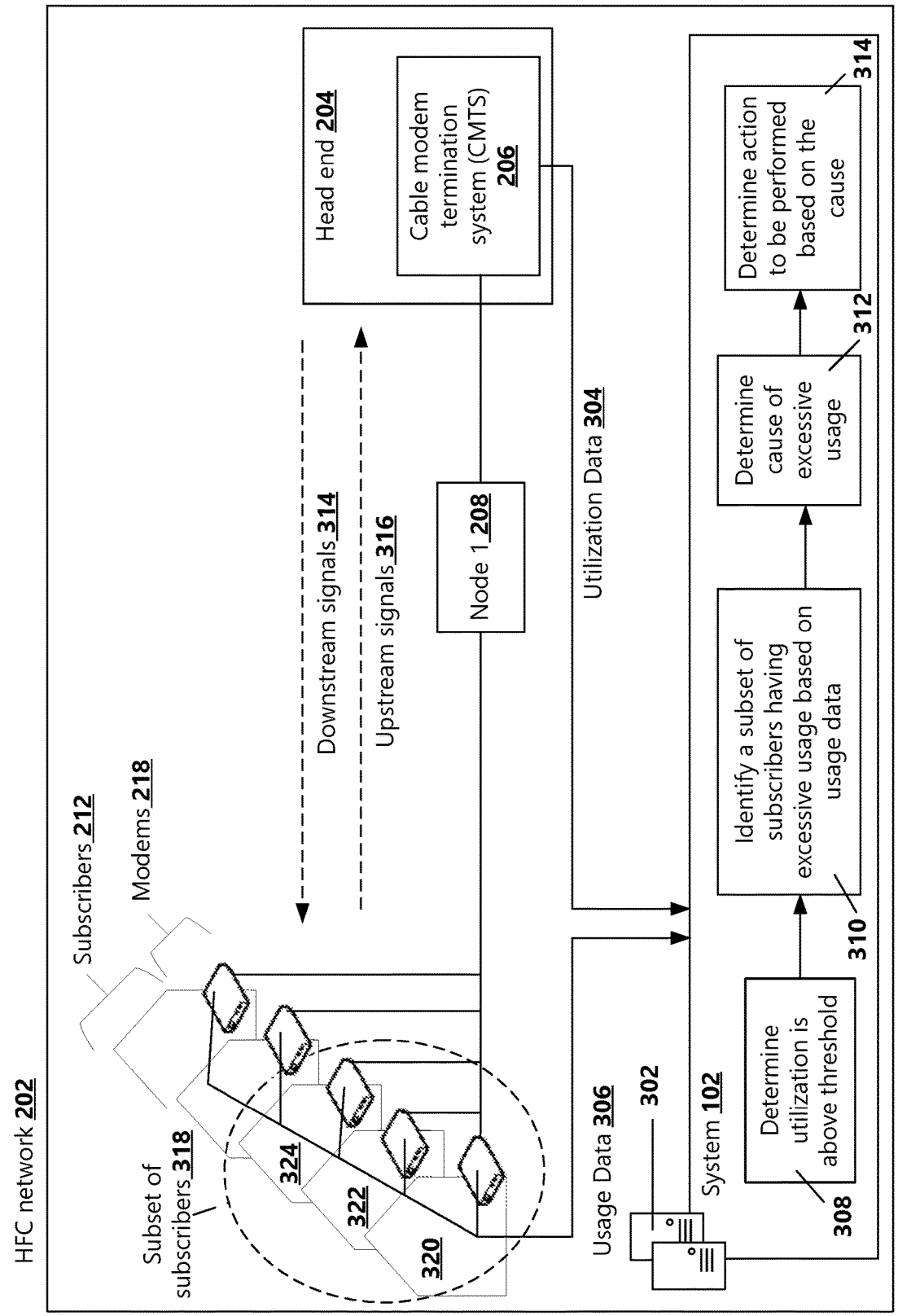
FIG. 3 is a conceptual illustration of an example embodiment of a system for identifying and resolving excessive data usage to alleviate congestion on a node of an HFC network.

FIG. 3 is a conceptual illustration 300 of an example embodiment of a system 102 for identifying and resolving excessive data usage to alleviate congestion on a node (e.g., a first node 208) of an HFC network 202.

The system 102 may include one or more servers 302, each server comprising at least one processor and a memory including instructions to be executed by the processor (e.g., operations 308, 310, and 312). In some embodiments, the system 102 may be associated with and/or hosted by a service provider 104. In other embodiments, the system 102 may be hosted by a separate third party service.

The service provider 104 may be a cable company, for example. A CMTS 206 may be located at a head end 204 of the cable company, where the CMTS 206 provides high speed data services such as cable Internet, among other similar services, to a plurality of subscribers over a plurality of nodes of a HFC network 202. For example, the CMTS 206 may provide high speed data services to a first set of subscribers 212 over a first node 208 of the HFC network 202.

As described in conjunction with FIG. 2, in some embodiments, each of the plurality of nodes of the HFC network 202 may be monitored and analyzed to determine whether, based on utilization data, the utilization on the selected nodes is above a predetermined threshold at operation 308, and if so performing operations 310, 312, and 314 at the system 102. In other embodiments, to preserve resources, the system 102 may first prioritize the nodes based on a revenue at risk value calculated for each node such that the system 102 performs operations 310, 312, and 314 only on nodes with higher priorities that are determined to have a utilization above the predetermined threshold at operation 308.

In an example embodiment, the first node 208 may have a highest revenue at risk value and may be prioritized over the other nodes. The system 102 may receive utilization data 304 for the first node 208 from the CMTS 206. The CMTS 206 may monitor the utilization data 304 for the first node 208, as well as utilization data for each of the other plurality of nodes of the HFC network 202. The HFC network 202 may operate bi-directionally, whereby signals are transmitted in both downstream and upstream directions (e.g., downstream signals 314 and upstream signals 316). Therefore, the utilization data for a node may include an amount of data transmitted in both directions via the node. For example, the utilization data 304 for the first node 208 may include an amount of data transmitted in downstream signals 314 from the CMTS 206 to modems 218 of the first set of subscribers 212 via the first node 208 and an amount of data transmitted in upstream signals 316 from the modems 218 to the CMTS 206 via the first node 208.

The system 102 may determine whether utilization of the first node 208 is above a predetermined threshold based on the utilization data 304 at operation 308. One example threshold is an industry conventional wisdom threshold of 70%, above which service impact is likely to start being noticeable to subscribers. Data analysis of congestion levels against customer experience metrics has recently confirmed that service impact becomes noticeable once utilization exceeds this threshold. For example, data analysis indicated that a likelihood of a subscriber to call customer service increases as the utilization exceeds 70%.

If the utilization of the first node 208 is below the predetermined threshold, then the system 102 performs no further analysis because the level of the congestion on the nodes is not high enough to be of concern (e.g., the services provided via the nodes are not being impacted by the congestion). However, if the utilization of the first node 208 is above the predetermined threshold, the system 102 may identify a subset of subscribers 318 (e.g., a first subscriber 320, a second subscriber 322, and a third subscriber 324) from the first set of the subscribers 212 having excessive usage. The subset of subscribers 318 may be identified based on the first set of subscribers' usage data 306 at operation 308.

The usage data 306 may be monitored by the modems 218 of each of the first set of subscribers 212, where each subscriber is associated with at least one modem within the modems 218. The usage data 306 received from each of the modems 218 may include an amount of data a particular modem received from the CMTS 206 via the first node 208 (e.g., downstream usage). The usage data 306 may also include an amount of data transmitted from the particular modem via the first node 208 to the CMTS 206 (e.g., upstream usage). Thus, the usage data 306 may reveal each individual subscriber's data usage within the first set of the subscribers 112.

The subset of subscribers 318 may be identified by comparing the usage data 306 for each subscriber. The comparison may be made based only on downstream usage, only on upstream usage, or a combination of both upstream and downstream usage. In some embodiments, each individual subscriber's data usage on the first node 208 may be compared to a total data usage of the first set of the subscribers 112 on the first node 208 to determine a proportional data usage of the subscriber. In other embodiments, each individual subscriber's data usage on the first node 208 may be compared to a standard. For example, the standard may be a predetermined amount of data within a time period (e.g., a number of terabytes of data in a week period).

Individual subscribers within the first set of subscribers 212 having a data usage that is above a predetermined threshold may be included within the subset of subscribers 318. Based on the type of the comparison made (e.g., proportional or absolute), the predetermined threshold may be a percentage of total data usage or a static usage threshold as prescribed by the standard. In either embodiment, the predetermined threshold may be selected based on one or more business rules.

To provide an example, a proportional data usage may be determined for each subscriber by comparing each individual subscriber's data usage on the first node 208 to a total data usage of the first set of the subscribers 112 on the first node 208. The predetermined threshold may be a data usage percentage of five percent or more per subscriber. If a modem of the first subscriber 320 transmits one terabyte of data in a week period to the CMTS 206 via the first node 208 and the modems 218 transmit a total of ten terabytes collectively over the week period to the CMTS 206 via the first node 208, then the first subscriber 320 may represent ten percent of the upstream usage of the first node 208 over the week period. Because the first subscriber 320 has exceeded the predetermined threshold, the first subscriber 320 may be included within the subset of subscribers 318 having excessive data usage.

Similarly, if modem of a second subscriber 322 receives two terabytes of data in a week period from the CMTS 206 via the first node 208, and the modems 218 received a total of ten terabytes collectively over the week period from the CMTS 206 via the first node 208, then the second subscriber 322 may represent twenty percent of the downstream usage of the first node 208 over the week period. Because the second subscriber 322 has exceeded the predetermined threshold, the second subscriber 322 may be included within the subset of subscribers 318 having excessive data usage.

To provide a further example, a modem of the third subscriber 324 may transmit one terabyte of data in a week period (e.g., upstream usage) to the CMTS 206 via the first node 208 and may receive one terabyte of data in the same week period (e.g., downstream usage) from the CMTS 206 via the first node 208. The modems 218 may collectively transmit and receive a total of twenty terabytes to and from the CMTS 206 via the first node 208 over the week period. Thus, the third subscriber 324 may represent ten percent of the combined upstream and downstream usage of the first node 208 over the week period. Because the third subscriber 324 has exceeded predetermined threshold, the third subscriber 324 may be included within the subset of subscribers 318 having excessive data usage.

Once the subset of subscribers 318 has been identified, the system 102 may determine a cause of the excessive data usage by each of the subscribers within the subset of subscribers 318 (e.g., the first subscriber 320, the second subscriber 322, and the third subscriber 324) at operation 310. The system 102 may then determine an action to be performed based on the cause at operation 312 in order to alleviate the congestion on the first node 208. In some embodiments, the system 102 may work in conjunction with the service provider 104 to notify the subset of subscribers 318 and/or perform the actions. For example, if the system 102 is associated with or hosted by the service provider 104. In other embodiments, the system 102 may provide this information to the service provider 104 (e.g., the identified subset of subscribers, the causes, and the determined actions), and the service provider 104 may independently interact with the subset of subscribers 318 and perform the actions. For example, if the system 102 is hosted by a third party service.

In an example scenario, the determined cause for the excessive data usage of the first subscriber 320 may simply be that the first subscriber 320 uses more data. In response, the services of the first subscriber 320 may be transferred to a different platform such that the first subscriber 320 is no longer on the first node 208. For example, the service provider 104 may transfer the services from the HFC network 202 to a fully fiber solution. By removing the first subscriber 320 from the first node 208, the utilization on the first node 208 may decrease congestion.

In another example scenario, the determined cause for the excessive data usage of the second subscriber 322 may be malware detected on one or more devices associated with the second subscriber 322, where the devices may be within a home or internal network of the second subscriber 322. Once the subset of subscribers 318 is identified, the system 102 and/or the service provider 104 may determine whether modems associated with each subscriber within the subset of subscribers 318 are infected with malware. If malware is detected on a computing device, such as a computing device of the second subscriber 322, the malware may be removed. The removal may be automatic or instructions may be provided to the second subscriber 322 on how to remove the malware.

In a further example scenario, the determined cause for the excessive data usage of the third subscriber 324 may be a violation of a policy, such as an acceptable use policy of the service provider 104. Once the subset of subscribers 318 is identified, the system 102 and/or the service provider 104 may determine whether each subscriber within the subset of subscribers 318 are using services in violation of a policy (e.g., whether a device in a home or internal network of each subscriber is in violation). In one example, the third subscriber 324 may be running a server on an internal network of a residential subscriber account, which is in violation of the service provider's acceptable use policy. If the system 102 determines that a subscriber, such as the third subscriber 324 is in violation of a policy, the subscriber may be contacted with details about the violation and instructions on how to get in compliance with the policy.

In some embodiments, notifications may be provided to the subset of the subscribers 318 before any of the determined actions are taken. For example, the notification may indicate to a subscriber that they have excessive data usage, provide determined causes for the excessive usage, and provide information about actions to be taken by the system 102 and/or the service provider 104 in order to alleviate congestion on the first node 208. The notifications may be provided as text messages, emails, and/or pop-up windows within a service provider portal, among other similar methods of communication. Examples of the notifications are provided in FIGS. 4A, 4B, and 4C.

Figure 4B:
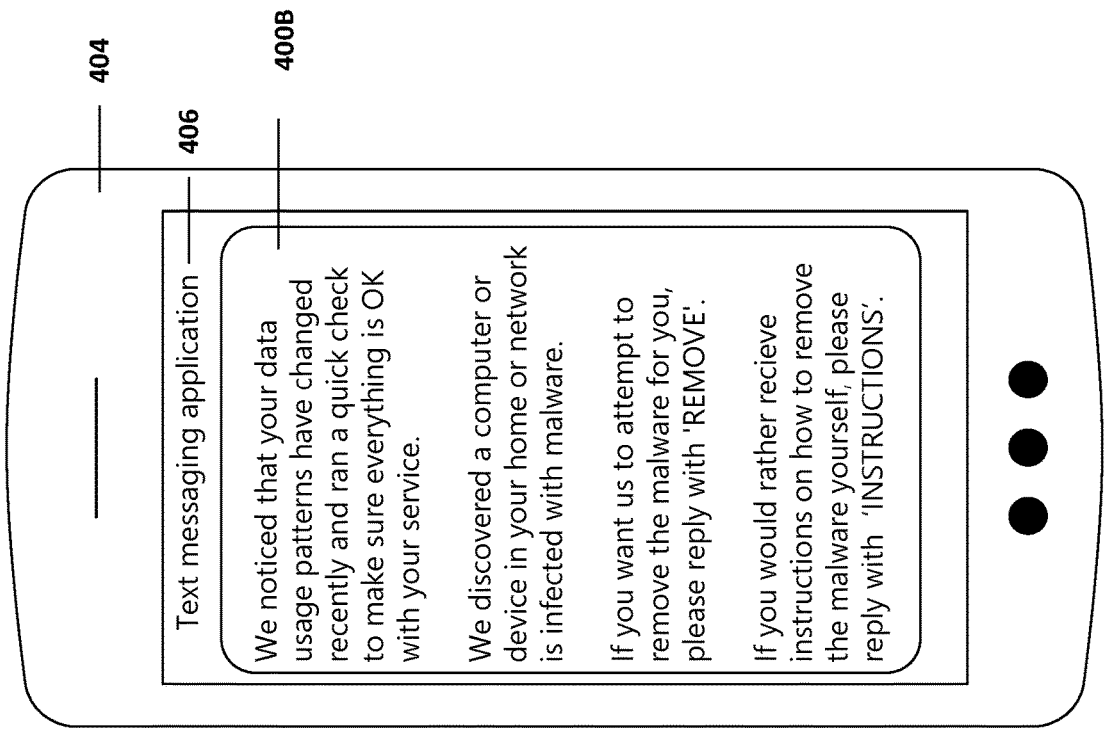
Figure 4C:
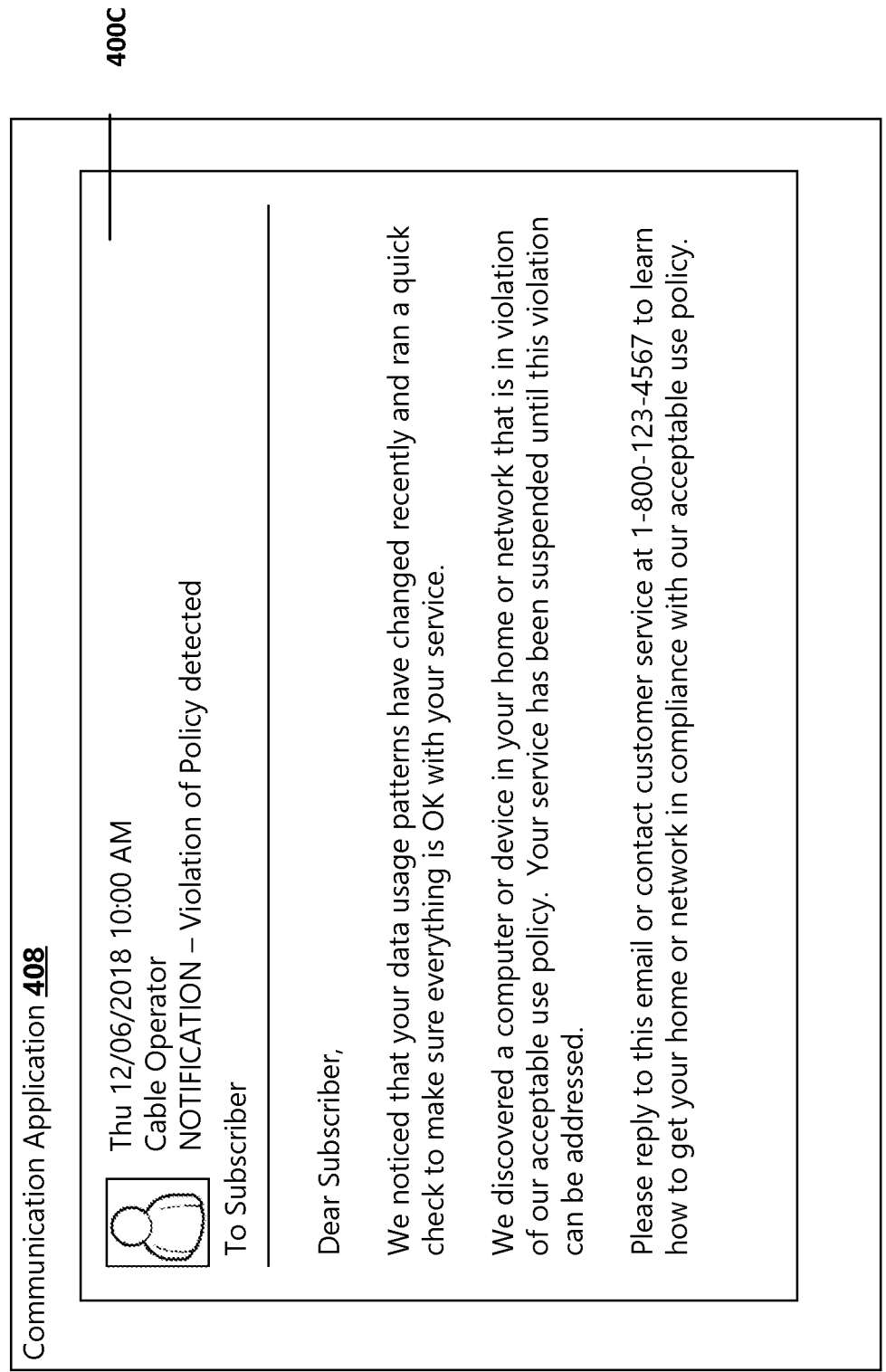

FIGS. 4A, 4B, and 4C illustrate example notifications provided to subscribers identified as having excessive data usage. As previously described in detail, if the system 102 identifies a subscriber serviced by a congested node that has excessive data usage, the system 102 may determine a cause of the excessive usage and determine an action to be performed based on the determined cause to alleviate congestion on the node. In some embodiments, the system 102 may generate a notification to be provided to the subscriber before any action is taken. The system 102 may provide the notification directly to the subscriber or the system 102 may provide the notification to a service provider 104, who may then provide the notification to the subscriber. The notification may indicate to the subscriber that they have excessive data usage, provide any causes for the excessive usage, and provide information about actions to be taken, among other information.

As illustrated in FIG. 4A, the service provider 104 may host a portal 402. Through the portal 402, the service provider 104 may provide information about the subscriber's services and enable the subscriber to pay for their services, add additional services, request for assistance, etc. For example, the portal 402 may be executed on a thin version of an application (e.g., a web browser) or a thick version of the application (e.g., a locally installed application) associated with the service provider 104. In one example, a notification 400A may be provided to a subscriber identified as having excessive data usage through the portal 402. The notification 400A may be in the form of a pop-up window, or other similar user interface feature, displayed in the portal 402.

The cause of the subscriber's excessive data usage may simply be that the subscriber uses more data. Accordingly, the notification 400A may inform the subscriber of a change noticed in their data usage patterns and provide a recommendation to transfer services to a different platform. For example, the recommendation may be to transfer the subscriber's services from the HFC network 202 to a fully fiber solution. The notification 400A may provide the subscriber a selectable option to authorize the service provider 104 to proceed with the transfer. The notification 400A may also provide the subscriber with a link to learn more information or contact information if the subscriber wishes to talk to an agent of the service provider 104.

As illustrated in FIG. 4B, a subscriber may receive a notification 400B as a text message through a text messaging application 406 executing on the subscriber's mobile device 404. The cause of the subscriber's excessive data usage may be malware detected on one or more devices in the subscriber's home or internal network by the system 102. Accordingly, the notification 400B may inform the subscriber of a change noticed in their data usage patterns and the cause for the change being malware, and provide a recommendation to remove the malware. The notification 400B may provide the subscriber a first option to have the malware removed by the service provider 104 and a second option to receive instructions on how to remove the malware themselves. The subscriber may select the first or second option by replying to the text message with a specific phrase unique to each option, for example.

As illustrated in FIG. 4C, a subscriber may receive a notification 400C as an email message through a communication application 408 executing on one or more of the subscriber's devices, such as a desktop computer, laptop computer, mobile device, or tablet, among other examples. The cause of the subscriber's excessive usage may be the subscriber's violation of a policy, such as an acceptable use policy of the service provider 104. Accordingly, the notification 400C may inform the subscriber of a change noticed in their data usage patterns and the cause for the change being a policy violation, and provide details about the violation and instructions on how to get in compliance with the policy.

The example notifications provided in FIGS. 4A, 4B, and 4C are intended to be illustrative. Embodiments are not limited to these notification configurations. Other types of notifications and modes for transmitting the notifications may be implemented, where the notifications may be displayed using a textual scheme, a graphical scheme, an audio scheme, an animation scheme, a coloring scheme, a highlighting scheme, and/or a shading scheme to enhance the notifications.

The examples provided in FIGS. 1 through 4C are illustrated with specific systems, networks, services, devices, processes, and notifications. Embodiments are not limited to environments according to these examples. Identification and resolution of excessive data usage to alleviate network congestion may be implemented in environments employing fewer or additional systems, networks, services, devices, processes, and notifications. Furthermore, the example systems, networks, services, devices, processes, and notifications shown in FIGS. 1 through 4C may be implemented in a similar manner with other values using the principles described herein.

Figure 5:
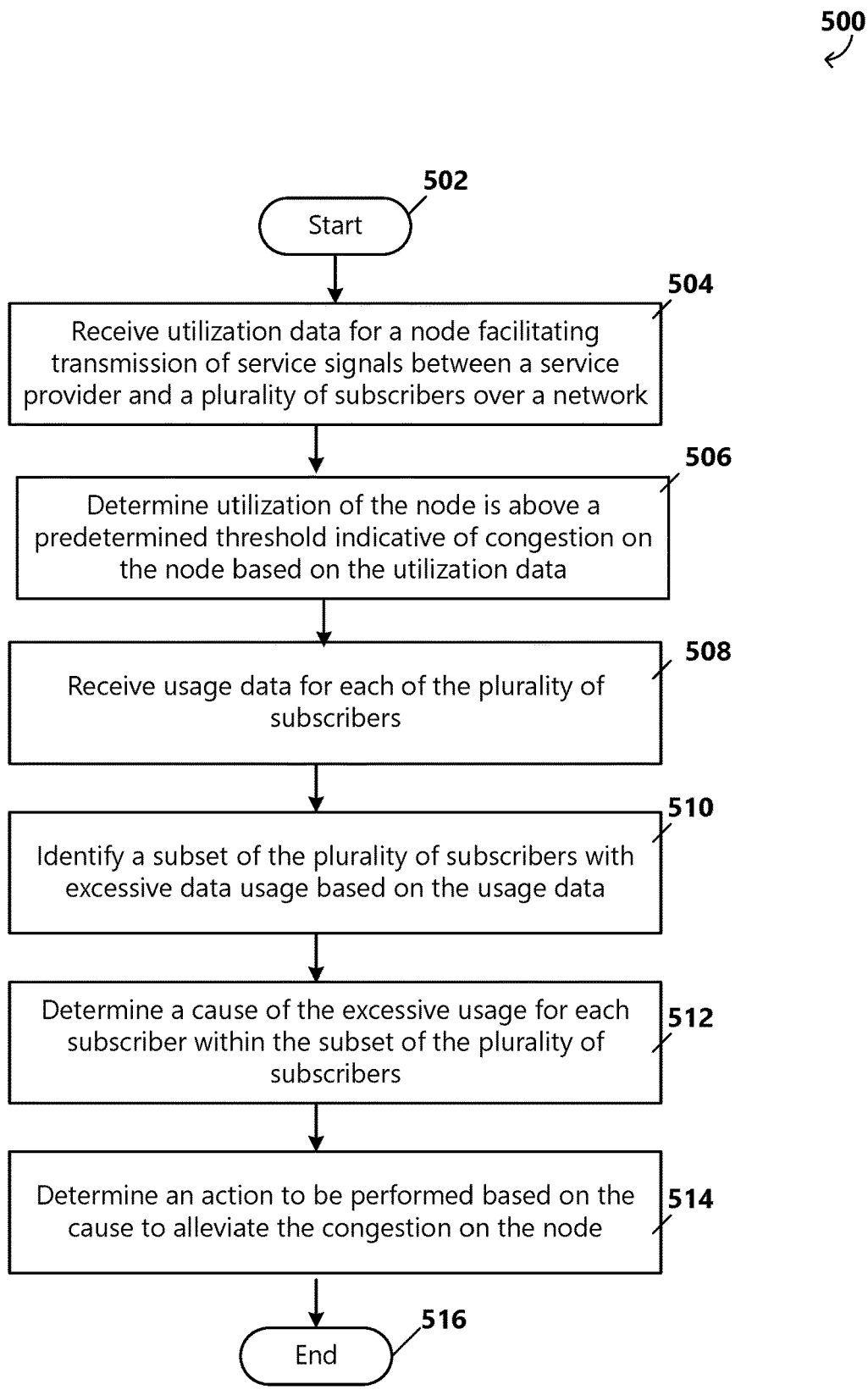
FIG. 5 is a flow diagram depicting general stages of an example process for alleviating congestion on a node of a network according to an embodiment.

FIG. 5 is a flow diagram that depicts general stages of an example method 500 for alleviating congestion on a node 110 of a network according to an embodiment. The method 500 begins at START OPERATION 502, and proceeds to OPERATION 504 where a system 102 may receive utilization data for a node 110 that facilitates transmission of service signals between a service provider 104 and a plurality of subscribers 106 over a network, such as an HFC network 202. The system 102 may be hosted by the service provider 104 providing the service signals to the plurality of subscribers 106 via the node 110 and/or hosted by a third party service.

The system 102 may receive the utilization data (e.g., utilization data 304) from the service provider 104, where the service provider 104 monitors an amount of data transmitted between a CMTS 206 and the plurality of subscribers 106 via the node 110. At OPERATION 506, based on utilization data, a utilization of the node 110 is determined to be above a predetermined threshold indicative of congestion on the node 110.

At OPERATION 508 the system 102 receives usage data (e.g., usage data 306) for each of the plurality of subscribers 106. The usage data is received from modems of each subscriber (e.g., modems 118 of the first set of the subscribers 112), where each modem monitors an amount of data received from and transmitted to the service provider 104 via the node 110. At OPERATION 510 the system 102 identifies a subset of the plurality of subscribers 108 with excessive data usage based on the usage data 306.

At OPERATION 512 the system 102 may determine the cause of the excessive usage for each subscriber within the subset of the plurality of subscribers 108. Example causes may include excessive usage, malware, and/or policy violations, among other causes. At OPERATION 514 the system 102 may determine an action to be performed based on the cause to alleviate congestion on the node 110. Example actions may include transferring the subscriber's services to another platform, removing malware, and/or providing details on the violations and instructions on how to get in compliance with the policies. The method 500 ends at OPERATION 516.

Figure 6:
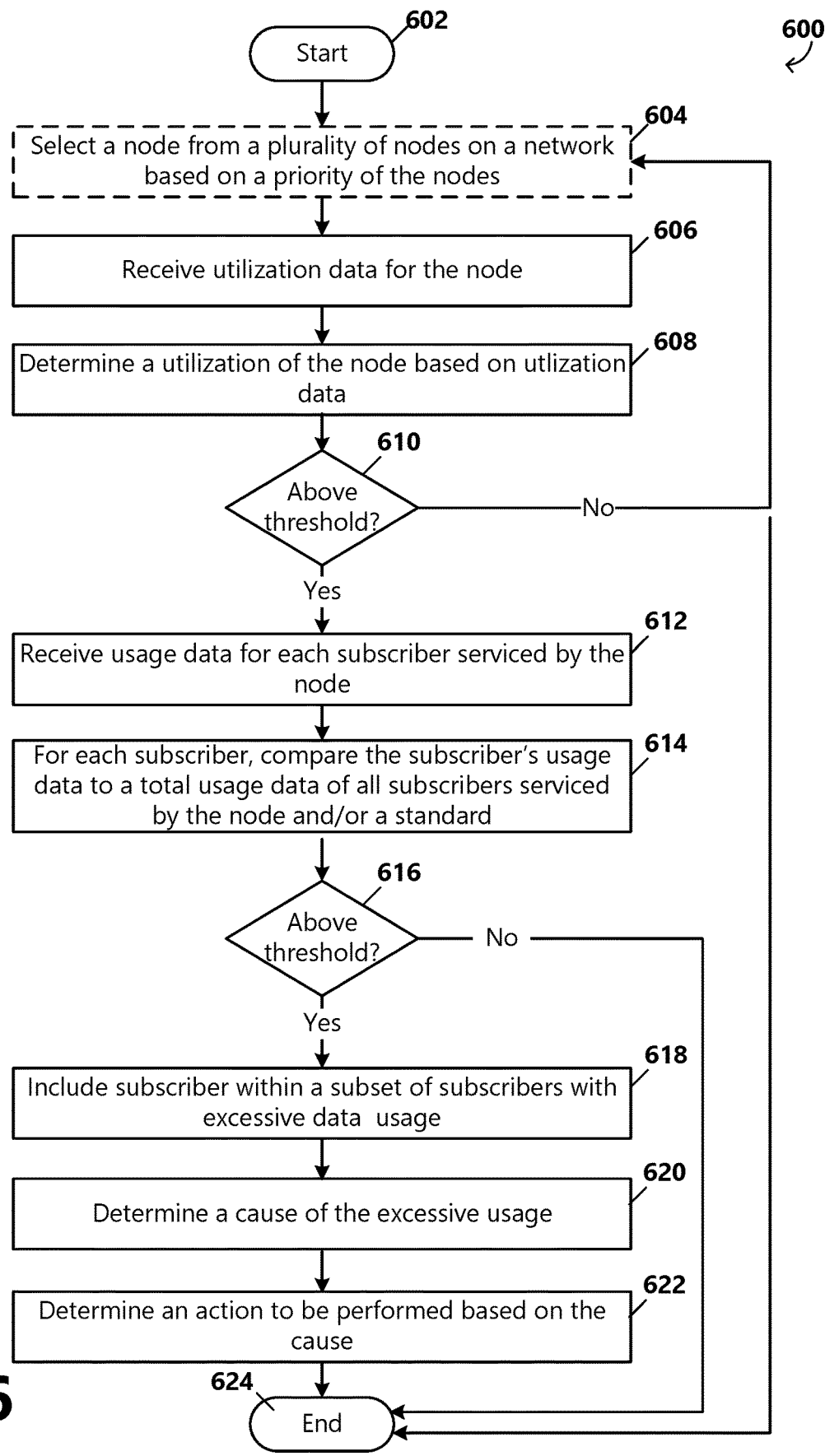
FIG. 6 is a flow diagram depicting more detailed stages of an example process for alleviating congestion on a node of a network according to an embodiment.

FIG. 6 is a flow diagram that depicts more detailed stages of an example method 600 for alleviating congestion on a node 110 of a network according to an embodiment. The method 600 begins at START OPERATION 602, and proceeds to optional OPERATION 604 where a system 102 may optionally select a node 110 from a plurality of nodes on a network based on a priority of the nodes. For example, the network may be an HFC network 202 comprising a plurality of nodes that facilitate transmission of service signals between a service provider 104 and a plurality of subscribers 106. The nodes may be prioritized based on a revenue at risk value determined for each node. The revenue at risk value may be determined based on a number of the plurality of subscribers serviced by the node, an amount paid by each subscriber serviced by the node, an ability to obtain additional subscribers to be serviced by the node, and a level of service currently provided by the node. If more than one node is selected, the system 102 may perform the following operations for each of the selected nodes. If a node is not selected, the system 102 may perform the following operations for each of the plurality of nodes within the network. Additionally or alternatively, the node 110 may not be selected based on priority until a set of nodes from the plurality of nodes, including node 110, have been determined to have utilizations above the predetermined threshold (e.g., selected between DECISION 610 and OPERATION 612).

At OPERATION 606, the system 102 may receive utilization data (e.g., utilization data 304) for the node 110. The system 102 may receive the utilization data from the service provider 104, where the service provider 104 monitors an amount of data transmitted between a CMTS 206 and the plurality of subscribers 108 via the node 110. At OPERATION 608 the system 102 determines a utilization of the node 110 based on the utilization data.

AT DECISION 610, the system 102 determines whether the utilization of the node 110 is above a predetermined threshold that is indicative of congestion on the node 110. If the utilization of the node 110 is not above the predetermined threshold, the system 102 may return to optional OPERATION 604 to select another node. Alternatively, the method 600 may proceed to OPERATION 624 and no further analysis may be performed by the system 102. If the utilization of the node 110 is above the predetermined threshold, the system 102 may receive usage data (e.g., usage data 306) for each subscriber serviced by the node 110 at OPERATION 612. The usage data may be received from modems of each subscriber (e.g., modems 218 of the first set of subscribers 112), where each modem monitors an amount of data received from and transmitted to the service provider 104 via the node 110.

At OPERATION 614 the system 102 compares the usage data received for each subscriber. In some embodiments, a subscriber's data usage is compared to a total usage data received for all subscribers serviced by the node to determine the subscriber's proportional data usage. In other embodiments, a subscriber's absolute data usage is compared to a standard. At DECISION 616, the system 102 determines whether the subscriber's proportional and/or absolute data usage yielded by the comparison is above a predetermined threshold. Based on the type of comparison performed, the predetermined threshold may be a percentage of total data usage or a static usage threshold as prescribed by the standard. If the subscriber's proportional and/or absolute data usage is not above the predetermined threshold, the method 600 proceeds to OPERATION 624 and no further analysis may be performed by the system 102. If the subscriber's proportional and/or absolute data usage is above the predetermined threshold, the subscriber is identified as having excessive data usage and is included within a subset of subscribers with excessive data usage at OPERATION 618.

At OPERATION 620 the system 102 may determine the cause of the excessive usage for the subscriber. Example causes may include excessive usage, malware, and/or policy violations, among other causes. At OPERATION 622 the system 102 may determine an action to be performed based on the cause to alleviate congestion on the node. Example actions may include transferring the subscriber's services to another platform, removing malware, and/or providing details on the violations and instructions on how to get in compliance with the policies. The method 500 ends at OPERATION 514.

Figure 7:
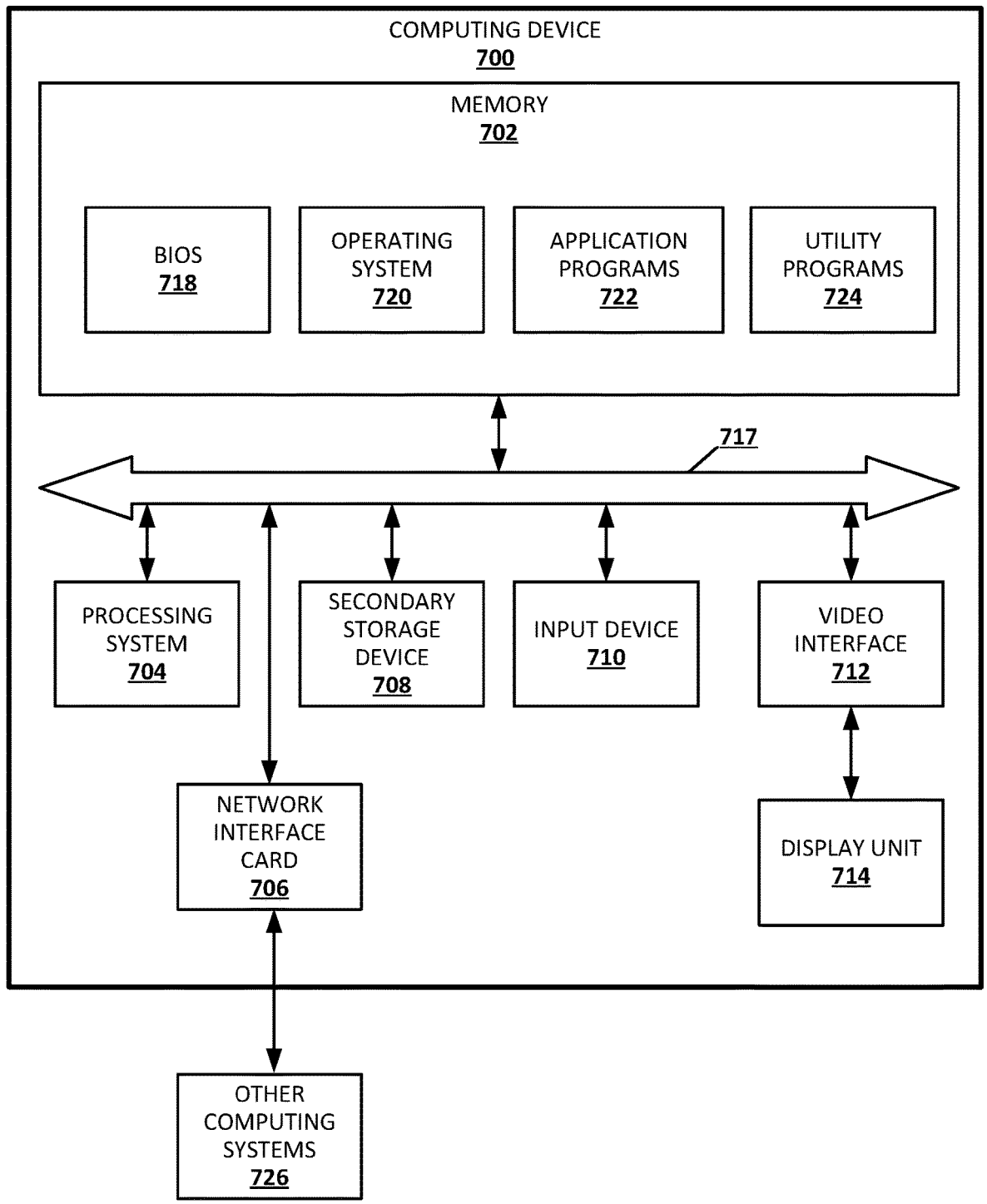
FIG. 7 is a block diagram illustrating example physical components of a computing device or system with which embodiments may be practiced.

FIG. 7 is a block diagram illustrating example physical components of a computing device or system 700 (e.g., system 102) with which embodiments may be practiced. It should be appreciated that in other embodiments, different hardware components other than those illustrated in the example of FIG. 7 may be used. Computing devices may be implemented in different ways in different embodiments. For instance, in the example of FIG. 7, the computing device 700 includes a processing system 704, memory 702, a network interface card 706 (wired and/or wireless), a secondary storage device 708, an input device 710, a video interface 712, a display unit 714, and a communication medium 717. In other embodiments, the computing device 700 may be implemented using more or fewer hardware components (e.g., a video interface, a display unit, or an input device) or in combination with other types of computer systems 726 and program modules.

The memory 702 includes one or more computer-readable storage media capable of storing data and/or computer-executable instructions. Memory 702 may store the computer-executable instructions that, when executed by a processor or processing unit of the processing system 704, cause operations (e.g., operations 308, 310, 312 and 314) to identify and resolve excessive data usage to alleviate node congestion. In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units (e.g., one or more processors), which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 717 facilitates communication among the hardware components of the computing device 700. In different embodiments, the communications medium 717 facilitates communication among different components of the computing device 700. For instance, in the example of FIG. 7, the communications medium 717 facilitates communication among the memory 702, the processing system 704, the network interface card 706, the secondary storage device 708, the input device 710, and the video interface 712. In different embodiments, the communications medium 717 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs or program code 722 that, when executed by the processing system 704, cause the computing device 700 to provide applications to users. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 8:
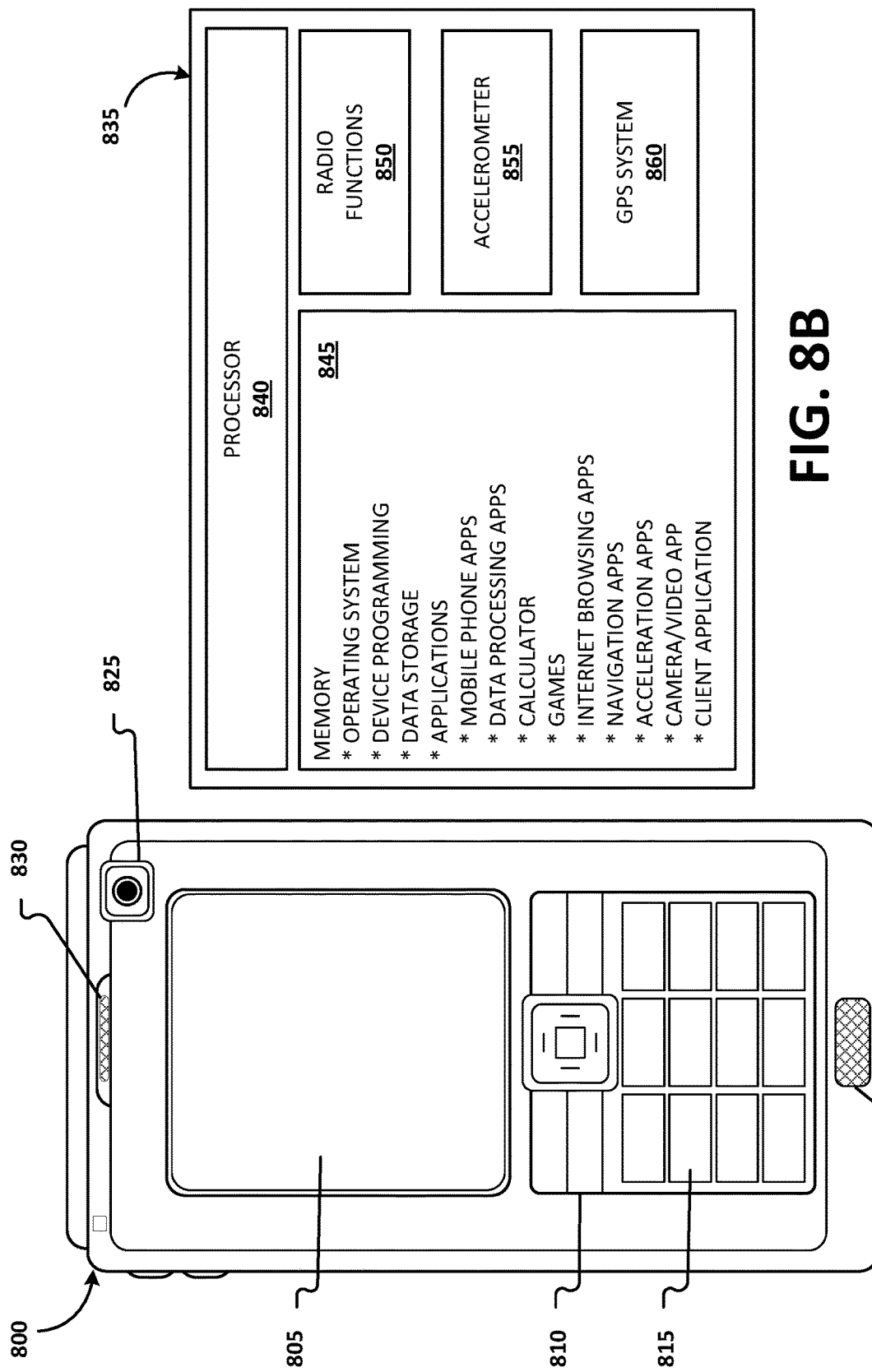
FIGS. 8A and 8B are block diagrams illustrating example physical components of a suitable mobile computing environment with which aspects of the present disclosure can be practiced.

FIGS. 8A-8B illustrate a suitable mobile computing device 800 or environment, for example, a mobile computing device or smart phone, a tablet personal computer, a laptop computer, or other client device with which aspects can be practiced. The mobile computing device 800 is illustrative of any suitable device operative to send, receive and process wireless communications. Referring now to FIG. 8A, a display screen 805 is operative for displaying a variety of information such as information about incoming and outgoing communications, as well as, a variety of data and displayable objects, for example, text, alphanumeric data, photographs, and the like.

Data input to the mobile computing device 800 can be performed via a variety of suitable means, such as, touch screen input via the display screen 805, keyboard or keypad input via a data entry area 810, key input via one or more selectable buttons or controls 815, voice input via a microphone 818 disposed on the mobile computing device 800, photographic input via a camera 825 functionality associated with the mobile computing device 800, or any other suitable input means. Data can be output via the mobile computing device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a computer processor for processing incoming and outgoing data and communications and controlling operation of the device and associated software applications via a mobile computing device operating system. Memory 845 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 800 can contain an accelerometer 855 for detecting acceleration, and can be used to sense orientation, vibration, and/or shock. Mobile computing device 800 can contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the mobile computing device 800 to communicate with other communication devices and systems via a wireless network. Radio functions 850 can be utilized to communicate with a wireless or WIFI-based positioning system to determine a device location.

Figure 9:
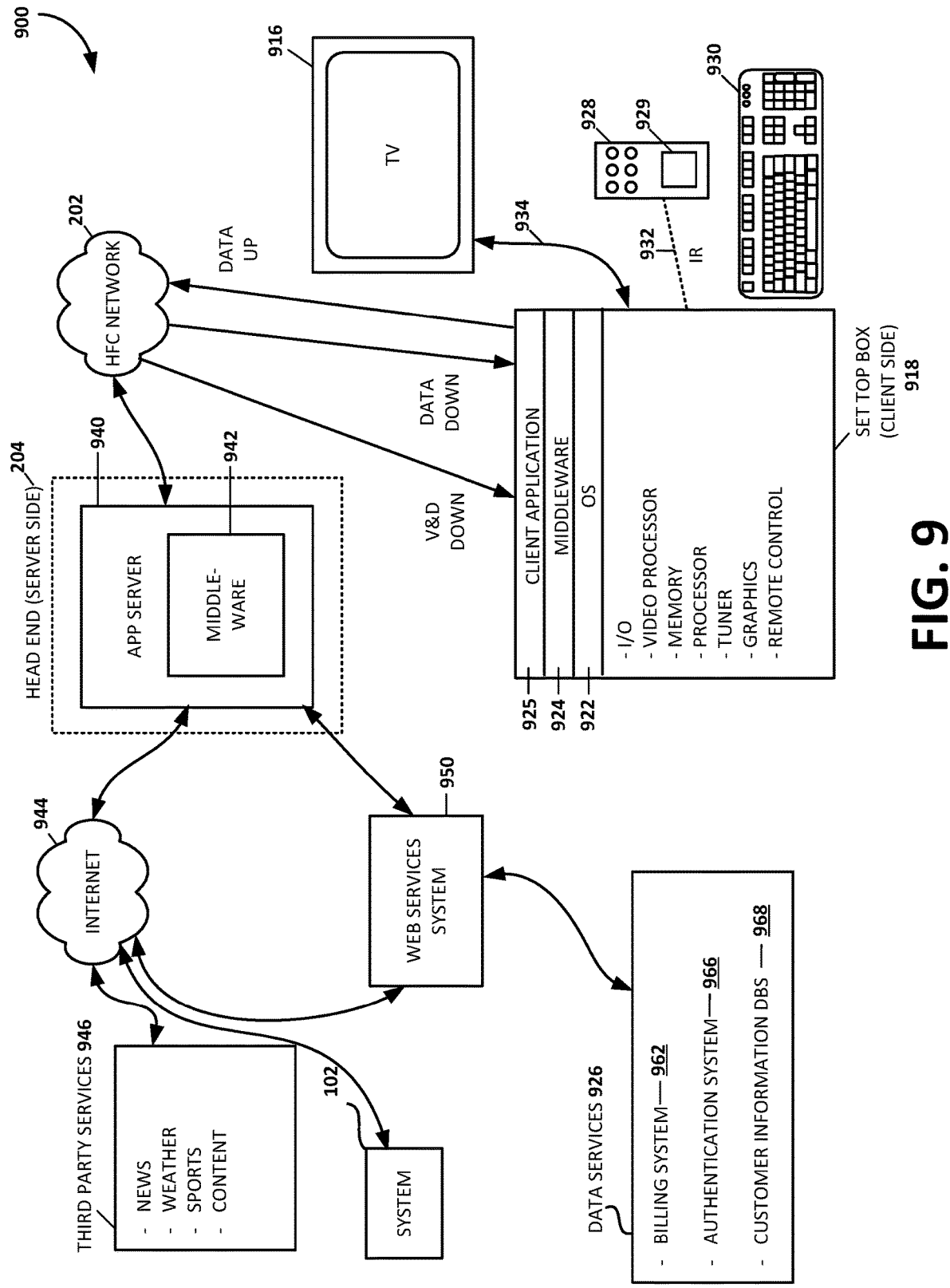
FIG. 9 is a block diagram illustrating components of a cable services system architecture providing an example operating environment according to aspects of the present disclosure.

FIG. 9 is a block diagram illustrating a cable television services system 900 (hereafter referred to as "CATV") architecture providing an operating environment according to an aspect. According to aspects, the service provider 104 can operate in the form of a CATV 900 as illustrated and described in FIG. 9. As should be appreciated, a CATV services system 900 is but one of various types of systems that can be utilized for providing an operating environment for providing supplemental content functionality described herein. Referring now to FIG. 9, digital and analog video programming, information content and interactive television services are provided via a HFC network 202 to a television set 916 for consumption by a cable television/services system customer. As is known to those skilled in the art, HFC networks 202 combine both fiber optic cable lines 214 and coaxial cable lines 216. Typically, fiber optic cable lines 214 run from the cable head end 204 to neighborhoods of subscribers. Coaxial cable lines 216 run from the optical fiber feeders to each customer or subscriber.

The CATV system 900 is in the form of a distributed client-server computing system for providing video and data flow across the HFC network 202 between server-side services providers (e.g., cable television/services providers), such as service provider 104, via a server-side head end 204 and a client-side customer via a set-top box (STB) 918 functionally connected to a customer receiving device, such as the television set 916. The functionality of the HFC network 202 allows for efficient bidirectional data flow between the set-top box 918 and an application server 940 of the server-side head end 204. As is understood by those skilled in the art, modern CATV systems 900 can provide a variety of services across the HFC network 202 including traditional digital and analog video programming, telephone services, high speed Internet access, video-on-demand, and services.

On the client side of the CATV system 900, digital and analog video programming and digital and analog data are provided to the customer television set 916 via the STB 918. Interactive television services that allow a customer to input data to the CATV system 900 likewise are provided by the STB 918. As illustrated in FIG. 9, the STB 918 is a multipurpose computing device having a computer processor, memory, and an input/output mechanism. The input/output mechanism receives input from server-side processes via the HFC network 202 and from customers via input devices such as a remote control device 928, keyboard 930, or other computing device, such as a tablet/slate computer, smart phone, etc. The remote control device 928 and the keyboard 930 can communicate with the STB 918 via a suitable communication transport such as the infrared connection 932. The remote control device 928 can include a biometric input module 929. The STB 918 also includes a video processor for processing and providing digital and analog video signaling to the television set 916 via a cable communication transport 934. A multi-channel tuner is provided for processing video and data to and from the STB 918 and the server-side head end 204, described below.

The STB 918 also includes an operating system 922 for directing the functions of the STB 918 in conjunction with a variety of client applications 925. For example, if a client application 925 requires a news flash from a third-party news source to be displayed on the television 916, the operating system 922 can cause the graphics functionality and video processor of the STB 918, for example, to output the news flash to the television 916 at the direction of the client application 925 responsible for displaying news items.

Because a variety of different operating systems 922 can be utilized by a variety of different brands and types of set-top boxes 918, a middleware layer 924 can be provided to allow a given software application to be executed by a variety of different operating systems. According to an embodiment, the middleware layer 924 can include a set of application programming interfaces (APIs) that are exposed to client applications and operating systems 922 that allow client applications 925 to communicate with the operating systems 922 through common data calls understood via the API set. As described below, a corresponding middleware layer 942 is included on the server side of the CATV system 900 for facilitating communication between the server-side application server and the client-side STB 918. The middleware layer 942 of the server-side application server and the middleware layer 924 of the client-side STB 918 can format data passed between the client side and server side according to the Extensible Markup Language (XML).

According to one aspect, the STB 918 passes digital and analog video and data signaling to the television 916 via a one-way communication transport 934. According to other aspects, two-way communication transports can be utilized, for example, via high definition multimedia (HDMI) ports. The STB 918 can receive video and data from the server side of the CATV system 900 via the HFC network 202 through a video/data downlink and data via a data downlink. The STB 918 can transmit data from the client side of the CATV system 900 to the server side of the CATV system 900 via the HFC network 202 via one data uplink. The video/data downlink is an "in band" downlink that allows for digital and analog video and data signaling from the server side of the CATV system 900 through the HFC network 202 to the STB 918 for use by the STB 918 and for distribution to the television set 916. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 9, between the HFC network 202 and the set-top box 918 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 918 and the server-side application server 940 is typically passed through the "out of band" data links. Alternatively, an "in band" data carousel can be positioned in an "in band" channel into which a data feed can be processed from the application server 940 through the HFC network 202 to the STB 918. Operation of data transport between components of the CATV system 900, described with reference to FIG. 9, is well known to those skilled in the art.

Referring still to FIG. 9, the head end 204 of the CATV system 900 is positioned on the server side of the CATV system and includes hardware and software systems responsible for originating and managing content for distributing through the HFC network 202 to client-side STBs 918 for presentation to customers. As described above, a number of services can be provided by the CATV system 900, including digital and analog video programming, interactive television services, telephone services, video-on-demand services, targeted advertising, and/or provision of supplemental content.

The application server 940 can be configured as a computing system operative to assemble and manage data sent to and received from the STB 918 via the HFC network 202. As described above, the application server 940 includes a middleware layer 942 for processing and preparing data from the head end 204 of the CATV system 900 for receipt and use by the client-side STB 918. For example, the application server 940 via the middleware layer 942 can obtain supplemental content from third-party services 946 via the Internet 944 for transmitting to a customer through the HFC network 202, the STB 918, and recording by a local or remote DVR. For example, content metadata from a third-party content provider service can be downloaded by the application server 940 via the Internet 944. When the application server 940 receives the downloaded content metadata, the middleware layer 942 can be utilized to format the content metadata for receipt and use by the STB 918. Therefore, content metadata can be sent and categorized based on the availability to the customer's program guide data.

According to one embodiment, data obtained and managed by the middleware layer 942 of the application server 940 is formatted according to the Extensible Markup Language and is passed to the STB 918 through the HFC network 202 where the XML-formatted data can be utilized by a client application 925 in concert with the middleware layer 924, as described above. As should be appreciated by those skilled in the art, a variety of third-party services data 946, including news data, weather data, sports data and other information content can be obtained by the application server 940 via distributed computing environments such as the Internet 944 for provision to customers via the HFC network 202 and the STB 918.

Additionally, the application server 940 may receive data from a system 102 via the Internet 944. In some embodiments, the system 102 may be hosted by the service provider. In other embodiments, the system 102 may be hosted by a third party, such as one of the third party services 946. The data received from the system 102 may include an identified subset of subscribers with excessive data usage, a cause of the excessive data usage, and one or more actions to be performed in order to alleviate congestion on the HFC network 202.

According to aspects, the application server 940 obtains customer support services data, including billing data, information on customer work order status, answers to frequently asked questions, services provider contact information, and the like from data services 926 for provision to the customer via an interactive television session. The data services 926 include a number of services operated by the services provider of the CATV system 900 which can include profile and other data associated with a given customer.

A billing system 962 can include information such as a customer's name, street address, business identification number, Social Security number, credit history, and information regarding services and products subscribed to by the customer. According to embodiments, the billing system 962 can also include billing data for services and products subscribed to by the customer for bill processing, billing presentment and payment receipt. An authentication system 966 can include information such as secure user names, subscriber profiles, subscriber IDs, and passwords utilized by customers for access to network services. A customer information database 968 can include general information about customers such as place of employment, business address, business telephone number, and demographic information such as age, gender, educational level, and the like. The customer information database 968 can also include information on pending work orders for services or products ordered by the customer. The customer information database 968 can also include general customer information such as answers to frequently asked customer questions and contact information for various service provider offices/departments. As should be understood, this information can be stored in a variety of disparate databases operated by the cable services provider.

Referring still to FIG. 9, web services system 950 is illustrated between the application server 940 and the data services 926. According to aspects, web services system 950 serves as a collection point for data requested from each of the disparate data services systems comprising the data services 926. According to aspects, when the application server 940 requires customer services data from one or more of the data services 926, the application server 940 passes a data query to the web services system 950. The web services system 950 formulates a data query to each of the available data services systems for obtaining any required data for a requesting customer as identified by a set-top box identification associated with the customer. The web services system 950 serves as an abstraction layer between the various data services systems and the application server 940. That is, the application server 940 is not required to communicate with the disparate data services systems, nor is the application server 940 required to understand the data structures or data types utilized by the disparate data services systems. The web services system 950 is operative to communicate with each of the disparate data services systems for obtaining necessary customer data. The customer data obtained by the web services system is assembled and is returned to the application server 940 for ultimate processing via the middleware layer 942, as described above. As should be understood by those skilled in the art, the disparate systems 950, 962, 966, 968 can be integrated or provided in any combination of separate systems, wherein FIG. 9 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for alleviating congestion on a node of a network, the at least one processor;
a system comprising: memory coupled to the at least one processor, the memory including instructions that when executed by the at least one processor cause the system to be operable to:
receive utilization data for the node, the node facilitating transmission of service signals between a service provider and a plurality of subscribers;
based on the utilization data, determine whether utilization of the node is above a first predetermined threshold indicative of congestion on the node; and
if the utilization of the node is above the first predetermined threshold:
receive usage data for each of the plurality of subscribers;
based on the usage data, identify a subset of the plurality of subscribers with excessive data usage; and
for each subscriber within the identified subset of the plurality of subscribers:
determine a cause of the excessive data usage;
determine an action to be performed based on the cause to alleviate the congestion on the node; and
implement the determined action,
wherein the determined action comprises one or more of:
notify a service provider of the identified subset of subscribers and the cause of the excessive data usage;
remove one or more subscribers within the identified subset of the plurality of subscribers to another node;
remove detected malware from a subscriber's computing device; and
contact a subscriber in violation of policy with details how to get in compliance with the policy.

2. The system of claim 1, wherein to identify the subset of the plurality of subscribers with excessive data usage based on the usage data, the system is operable to:
compare usage data for a subscriber to a total usage data for the plurality of subscribers to determine the subscriber's proportional data usage; and
include the subscriber within the identified subset of the plurality of subscribers when the subscriber's proportional data usage is above a second predetermined threshold.

3. The system of claim 1, wherein to identify the subset of the plurality of subscribers with excessive data usage based on the usage data, the system is operable to:
compare usage data for a subscriber to a third predetermined threshold associated with a standard; and
include the subscriber within the identified subset of the plurality of subscribers when the subscriber's absolute data usage is above the third predetermined threshold.

4. The system of claim 1, wherein the system is operable to receive the usage data for each of the plurality of subscribers from a modem associated with each subscriber.

5. The system of claim 4, wherein if more than one modem on the network is associated with a same subscriber, the usage data from the one or more modems is aggregated.

6. The system of claim 4, wherein the usage data for each of the plurality of subscribers includes an amount of data transmitted from the modem via the node and an amount of data received at the modem via the node.

7. The system of claim 1, wherein the system is operable to receive the utilization data for the node from the service provider, the utilization data including an amount of data transmitted from the service provider via the node and an amount of data received at the service provider via the node.

8. The system of claim 1, wherein the cause of the excessive data usage for a subscriber within the identified subset of the plurality of subscribers includes one or more of:
excessive data usage;
malware on a device of the subscriber; and
a policy violation associated with a device of the subscriber.

9. The system of claim 8, wherein if the cause is excessive data usage, the determined action is to transfer services provided to the subscriber off the network to a different platform.

10. The system of claim 8, wherein if the cause is malware on the device of the subscriber, the determined action is to remove the malware from the device.

11. The system of claim 10, wherein to determine the cause, the system is operable to:
upon identification of the subset of the plurality of subscribers with excessive data usage, automatically determine whether one or more devices in a home or on an internal network of each subscriber within the identified subset are infected with malware.

12. The system of claim 8, wherein if the cause is the policy violation, the determined action is to provide the subscriber details on the violation and instructions on how to become compliant with the policy.

13. The system of claim 12, wherein to determine the cause, the system is operable to:
upon identification of the subset of the plurality of subscribers with excessive data usage, automatically determine whether one or more devices in a home or on an internal network of each subscriber within the identified subset are in violation of one or more policies.

14. A method for alleviating congestion on a node of a network, the method comprising:
   receiving utilization data for the node, the node facilitating transmission of service signals between a service provider and a plurality of subscribers;
   based on the utilization data, determining whether utilization of the node is above a predetermined threshold indicative of congestion on the node; and
   if the utilization of the node is above the predetermined threshold:
      receiving usage data for each of the plurality of subscribers;
      based on the usage data, identifying a subset of the plurality of subscribers with excessive data usage; and
      for each subscriber within the identified subset of the plurality of subscribers:
         determining a cause of the excessive data usage;
         determining an action to be performed based on the cause to alleviate the congestion on the node; and
         implementing the determined action.

15. The method of claim 14, further comprising:
   selecting the node from a plurality of nodes of the network based on a prioritization of the plurality of nodes.

16. The method of claim 15, further comprising:
   prioritizing the plurality of nodes based on a revenue at risk value determined for each node.

17. The method of claim 16, further comprising:
   determining the revenue at risk value for each node based on a number of the plurality of subscribers serviced by the node, an amount paid by each subscriber serviced by the node, an ability to obtain additional subscribers to be serviced by the node, and a level of service currently provided by the node.

18. The method of claim 15, further comprising:
   in response to determining the utilization of the node is below the predetermined threshold indicative of congestion on the node, selecting another node from the plurality of nodes.

19. The method of claim 14, further comprising:
   generating a notification to provide to each subscriber within the identified subset of the plurality of subscribers prior to the determined action being performed, wherein the notification includes an indication of the excessive data usage, the cause of the excessive data usage, and the action to be performed.

20. A computer readable storage device that includes executable instructions which, when executed by a processor alleviate congestion on a node of a network, the instructions comprising:
   receiving utilization data for the node, the node facilitating transmission of service signals between a service provider and a plurality of subscribers;
   based on the utilization data, determining whether utilization of the node is above a predetermined threshold indicative of congestion on the node; and
   if the utilization of the node is above the predetermined threshold:
      receiving usage data for each of the plurality of subscribers;
      based on the usage data, identifying a subset of the plurality of subscribers with excessive data usage; and
      for each subscriber within the identified subset of the plurality of subscribers:
         determining a cause of the excessive data usage;
         determining an action to be performed based on the cause to alleviate the congestion on the node;
         generating a notification to provide to each subscriber within the identified subset of the plurality of subscribers prior to the determined action being performed; and
         implementing the determined action subsequent to generating the notification.

* * * * *